G. R. MORAN.
BALL BEARING.
APPLICATION FILED OCT. 6, 1914.
1,201,328.
Patented Oct. 17, 1916.
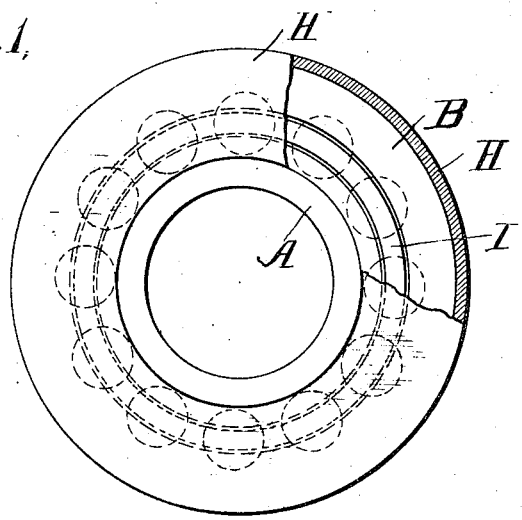
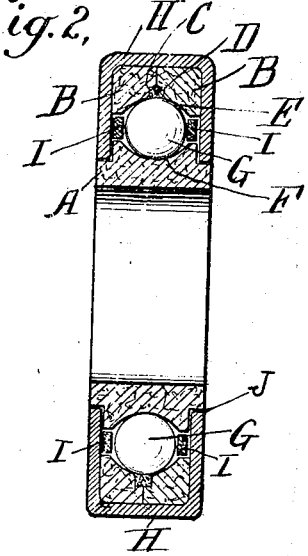
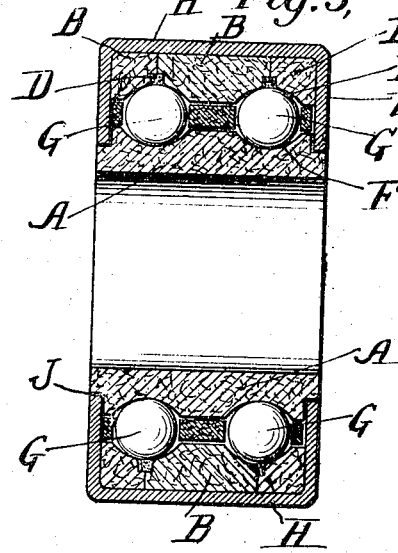
WITNESSES
INVENTOR
George R. Moran
BY
Kenyon & Kenyon
ATTORNEYS

UNITED STATES PATENT OFFICE.

GEORGE R. MORAN, OF SANDUSKY, OHIO.

BALL-BEARING.

1,201,328.  Specification of Letters Patent.  Patented Oct. 17, 1916.

Application filed October 6, 1914. Serial No. 865,244.

*To all whom it may concern:*

Be it known that I, GEORGE R. MORAN, a citizen of the United States, and a resident of the city of Sandusky, county of Erie, State of Ohio, have invented certain new and useful Improvements in Ball-Bearings, of which the following is a specification.

My invention relates to bearings or anti-friction devices, and I have shown the preferred or usual form of the invention applied to a ball-bearing.

My invention is adapted for use wherever an anti-friction device is desired, or a ball-bearing is desired, and is especially adapted for use in electrical apparatus, as will more clearly appear hereafter.

In the drawings in which like letters represent like parts, Figure 1 is a side view of a ball-bearing; Fig. 2 is a sectional view taken through the center of Fig. 1; and Fig. 3 is a sectional view taken through the center of a double-row ball-bearing.

A is the inner ring and B—B the outer ring. I preferably construct the outer ring of the two parts B—B, as shown, although, of course, it will be readily understood that if desired the inner ring may be constructed of two parts and the outer ring of one.

In the form of bearing shown in the drawings, the rings A and B—B are constructed from a material which is a non-conductor of electricity and may be any of the well-known non-conductors which have sufficient strength to use for the purpose for which the ball bearing is to be used. I have found that what is commonly known as horn fiber is very satisfactory material to use because of its strength.

The outer ring B—B formed of two parts, as shown, has located on its inner surface a raceway E. At the bottom of this raceway is located a rectangular groove which extends below the surface of the bottom of the raceway E, the sides of the groove C at the point where they come in contact with the raceway being gradually curved so as to avoid any sharp edge at that point, as shown at D in Figs. 2 and 3. Located in this groove is a felt, or some suitable material, saturated with, or adapted to carry a lubricant, or which is in and of itself a lubricating material.

The inner ring which, as shown in Figs. 2 and 3, is the one-piece ring, is in part of the same width as the outer ring formed of the members B—B, and the balance of it of a width equal to the width of the members B—B plus the cover or locking member H.

F is the raceway in the inner ring or cone.

I is the separator which may, or may not, be used depending upon whether or not the bearing is to be what is commonly known as a "full-type" bearing, or whether it is to be a "silent-type" bearing. In what is known as the full-type bearing no separators are used, and in what is known as the silent-type bearing, a separator between the balls is used, so that the balls do not come into contact with each other, the result being that in the silent-type fewer balls are used than in the full type.

The locking member, hood or shell H, when in position, is fixedly attached to the members B—B of the outer ring or cup by being spun over it. Of course, it is necessary, when this locking member or hood H is used to keep out foreign matter, that it pass over the space between the cone or inner ring A and the cup or outer ring B. It is therefore necessary to so construct it that at the point where it overlaps the cone or inner ring A, it will not bind or contact with the cone or inner ring A. Therefore I leave a clearance, represented by the letter J in the drawings, to permit of the free rotation of the inner ring or cone A, or the outer ring or cup B, whichever is so mounted as to be movable.

In the assembling of my bearing, if it is to be of the silent type, as shown, the inner ring is placed in position, one of the members B placed in position, the balls placed between the separator I, which in bearings made for electrical use is made of a section of fiber pipe, cut the desired width, with holes adapted to contain the balls G placed in its periphery. After the balls G, made preferably of steel, have been placed in the separator, the other member B is placed in position and the locking member, hood or cover H is then spun around the members B—B so as to lock same in position. This hood or cover may be made so as to only lock the two members B—B in position, or it may be extended down both sides of the bearing, as shown in Figs. 2 and 3, so as to form a dust-proof cover or hood to keep dirt and other foreign matter out of the bearing, or it may be extended down on one side only of the bearing, as in many instances where a bearing is used, it is housed so that only one side is exposed, and in such use, I would prefer to make the cover H extend down over the space between the inner and outer rings on the side where the bearing is exposed so as to keep out the foreign matter.

In assembling the bearing, the lubricant material, or lubricant-carrying material could be placed in position either when the first member B is arranged to receive the balls, or after the balls and separator, (if a separator is used), have been placed in position.

In Fig. 3, I have shown a modification of my invention for use in connection with a multiple bearing. The arrangement would be the same whether the bearing were to be a two-row bearing, or a bearing having a greater number of rows of balls. In this bearing, the outer ring is formed of three pieces B—B—B, held together by the hood, cover or lock H.

I claim—

1. In a ball-bearing, an inner ring of non-conducting material, a two-piece outer ring of non-conducting material, raceways in said inner and outer rings, anti-friction devices located within said raceways and a one-piece locking member for holding the parts of said outer ring in place, a portion of said locking means being arranged so as to completely inclose the space between the two rings on both sides of the bearing.

2. In a ball-bearing, an inner ring, an outer ring, raceways in the adjacent faces of said rings, said outer ring being formed of a plurality of parts in contact with each other, and a one-piece means for locking said parts together, a portion of said locking means on both sides of said bearing extending inward toward the axis of said bearing and overlapping a portion of the inner ring.

3. In a ball-bearing, an inner ring, an outer ring, raceways in the adjacent faces of said rings, said outer ring being formed of a plurality of parts in contact with each other, a one-piece means for locking said parts together, a portion of said locking means on both sides of said bearing extending inward toward the axis of said bearing and overlapping a portion of the inner ring, a channel in one of said raceways and lubricating means within said channel.

4. In a ball-bearing, an inner ring, an outer ring, raceways in the adjacent faces of said rings, said outer ring being formed of a plurality of parts in contact with each other, a one-piece means for locking said parts together, a portion of said locking means on both sides of said bearing extending inward toward the axis of said bearing and overlapping a portion of the inner ring and a non-conducting separator for the anti-friction devices.

5. In a ball-bearing, an inner ring, an outer ring, raceways in the adjacent faces of said rings, said outer ring being formed of a plurality of parts in contact with each other, and a one-piece means for locking said parts together, a portion of said locking means on both sides of said bearing extending inward toward the axis of said bearing and overlapping a portion of the inner ring, one of said raceways being constructed so as to have two contact points for the anti-friction devices.

6. In a ball-bearing, an inner ring, an outer ring, raceways in the adjacent faces of said rings, said outer ring being formed of a plurality of parts in contact with each other, a one-piece means for locking said parts together, a portion of said locking means on both sides of said bearing extending inward toward the axis of said bearing and overlapping a portion of the inner ring and a one-piece separator for separating the anti-friction devices.

In testimony whereof, I have signed my name to this specification, in the presence of two subscribing witnesses.

GEORGE R. MORAN.

Witnesses:
ED WARD,
NATHAN HOLLOWAY.